(12) United States Patent
Huang et al.

(10) Patent No.: US 11,743,018 B2
(45) Date of Patent: Aug. 29, 2023

(54) INITIAL SUBBAND CONFIGURATION FOR FULL DUPLEX

(71) Applicant: QUALCOMM Incorporated, San Diego, CA (US)

(72) Inventors: Yi Huang, San Diego, CA (US); Muhammad Sayed Khairy Abdelghaffar, San Jose, CA (US); Wanshi Chen, San Diego, CA (US); Huilin Xu, Temecula, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 17/301,111

(22) Filed: Mar. 25, 2021

(65) Prior Publication Data

US 2021/0314131 A1    Oct. 7, 2021

Related U.S. Application Data

(60) Provisional application No. 63/005,663, filed on Apr. 6, 2020.

(51) Int. Cl.
*H04L 5/14*        (2006.01)
*H04W 72/04*    (2023.01)
*H04W 48/16*    (2009.01)
*H04W 72/0453* (2023.01)

(52) U.S. Cl.
CPC ............... *H04L 5/14* (2013.01); *H04W 48/16* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2016/0269939 A1* | 9/2016 | Papasakellariou | H04L 1/189 |
| 2017/0026073 A1* | 1/2017 | Liu | H04L 5/0094 |
| 2018/0007667 A1* | 1/2018 | You | H04W 88/08 |
| 2018/0183557 A1* | 6/2018 | Ly | H04L 5/1469 |
| 2019/0089502 A1 | 3/2019 | Yi et al. | |
| 2020/0314889 A1* | 10/2020 | Cirik | H04W 72/14 |

FOREIGN PATENT DOCUMENTS

WO    2017111821 A1    6/2017

OTHER PUBLICATIONS

International Search Report and Written Opinion—PCT/US2021/024393—ISA/EPO—dated Jun. 10, 2021.

* cited by examiner

*Primary Examiner* — Saba Tsegaye
(74) *Attorney, Agent, or Firm* — Harrity & Harrity, LLP

(57) ABSTRACT

Various aspects of the present disclosure generally relate to wireless communication. In some aspects, a user equipment (UE) may receive a system information block (SIB) indicating a plurality of subband configurations. The UE may identify, based at least in part on one or more of the plurality of subband configurations, one or more uplink subbands in a time division duplexing (TDD) component carrier and one or more downlink subbands in the TDD component carrier. The one or more uplink subbands and the one or more downlink subbands may be frequency division duplexed within the TDD component carrier. Numerous other aspects are provided.

30 Claims, 9 Drawing Sheets

INITIAL SUBBAND CONFIGURATION FOR FULL DUPLEX

CROSS-REFERENCE TO RELATED APPLICATION

This Patent Application claims priority to U.S. Provisional Patent Application No. 63/005,663, filed on Apr. 6, 2020, entitled "INITIAL SUBBAND CONFIGURATION FOR FULL DUPLEX," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for initial subband configuration for full duplex.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving a system information block (SIB) indicating a plurality of subband configurations; and identifying, based at least in part on one or more of the plurality of subband configurations, one or more uplink subbands in a time division duplexing (TDD) component carrier and one or more downlink subbands in the TDD component carrier, wherein the one or more uplink subbands and the one or more downlink subbands are frequency division duplexed within the TDD component carrier.

In some aspects, a method of wireless communication, performed by a base station, may include configuring a SIB indicating a plurality of subband configurations, wherein the plurality of subband configurations indicate one or more uplink subbands in a TDD component carrier and one or more downlink subbands in the TDD component carrier, wherein the one or more uplink subbands and the one or more downlink subbands are frequency division duplexed within the TDD component carrier; and transmitting the SIB indicating the plurality of subband configurations.

In some aspects, a user equipment (UE) for wireless communication may include a memory and one or more processors operatively coupled to the memory. The memory and the one or more processors may be configured to receive a SIB indicating a plurality of subband configurations; and identify, based at least in part on one or more of the plurality of subband configurations, one or more uplink subbands in a TDD component carrier and one or more downlink subbands in the TDD component carrier, wherein the one or more uplink subbands and the one or more downlink subbands are frequency division duplexed within the TDD component carrier.

In some aspects, a base station (BS) for wireless communication may include a memory and one or more processors operatively coupled to the memory. The memory and the one or more processors may be configured to configure a SIB indicating a plurality of subband configurations, wherein the plurality of subband configurations indicate one or more uplink subbands in a TDD component carrier and one or more downlink subbands in the TDD component carrier, wherein the one or more uplink subbands and the one or more downlink subbands are frequency division duplexed within the TDD component carrier; and transmit the SIB indicating the plurality of subband configurations.

In some aspects, a non-transitory computer-readable medium may store one or more instructions for wireless communication. The one or more instructions, when executed by one or more processors of a UE, may cause the one or more processors to receive a SIB indicating a plurality of subband configurations; and identify, based at least in part on one or more of the plurality of subband configurations, one or more uplink subbands in a TDD component carrier and one or more downlink subbands in the TDD component carrier, wherein the one or more uplink subbands and the one or more downlink subbands are frequency division duplexed within the TDD component carrier.

In some aspects, a non-transitory computer-readable medium may store one or more instructions for wireless communication. The one or more instructions, when executed by one or more processors of a BS, may cause the one or more processors to configure a SIB indicating a plurality of subband configurations, wherein the plurality of subband configurations indicate one or more uplink subbands in a TDD component carrier and one or more downlink subbands in the TDD component carrier, wherein the one or more uplink subbands and the one or more downlink subbands are frequency division duplexed within the TDD component carrier; and transmit the SIB indicating the plurality of subband configurations.

In some aspects, an apparatus for wireless communication may include means for receiving a SIB indicating a plurality of subband configurations; and means for identifying, based at least in part on one or more of the plurality of subband configurations, one or more uplink subbands in a TDD component carrier and one or more downlink subbands in the TDD component carrier, wherein the one or more uplink subbands and the one or more downlink subbands are frequency division duplexed within the TDD component carrier.

In some aspects, an apparatus for wireless communication may include means for configuring a SIB indicating a plurality of subband configurations, wherein the plurality of subband configurations indicate one or more uplink subbands in a TDD component carrier and one or more downlink subbands in the TDD component carrier, wherein the one or more uplink subbands and the one or more downlink subbands are frequency division duplexed within the TDD component carrier; and means for transmitting the SIB indicating the plurality of subband configurations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
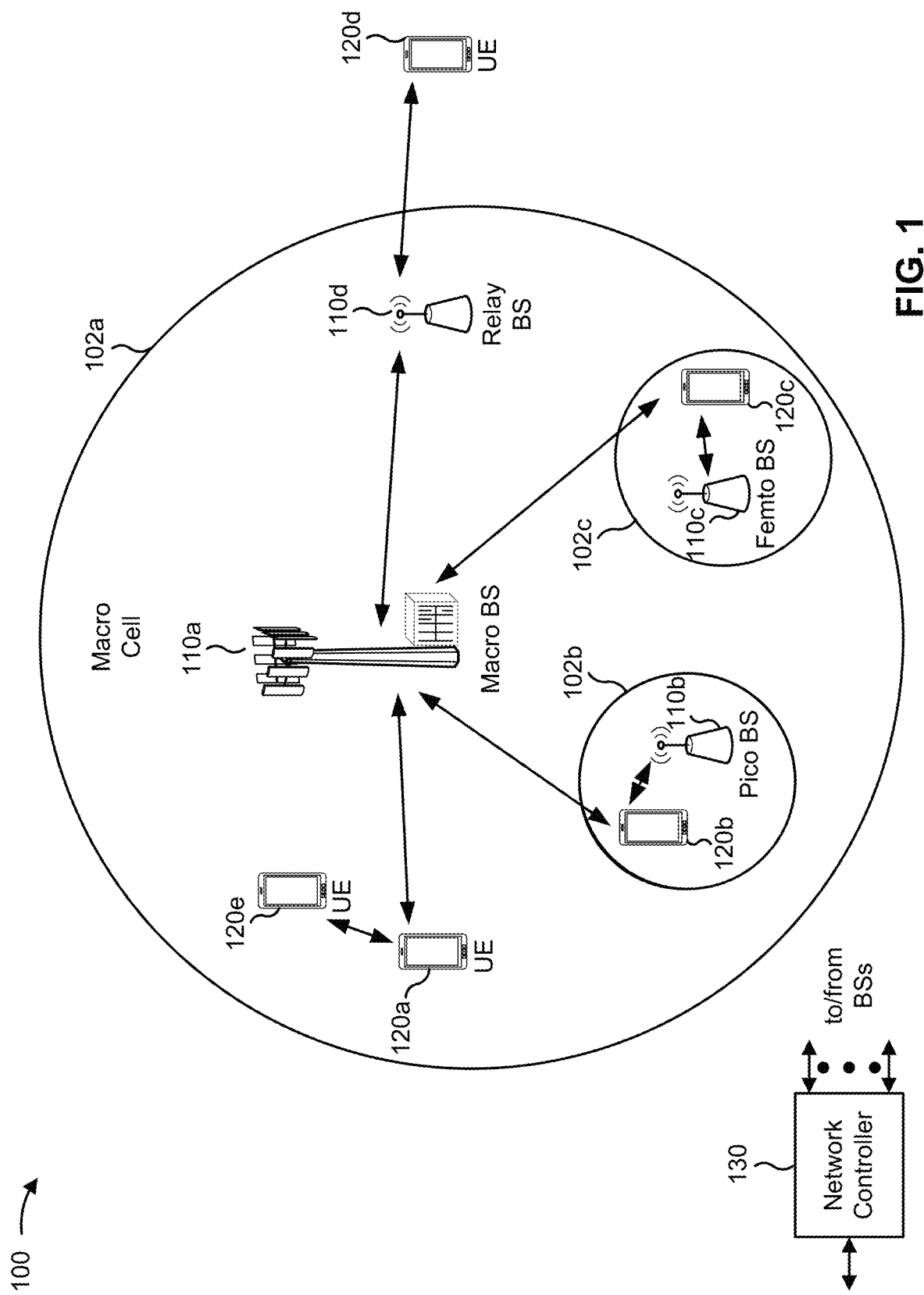
FIG. 1 is a diagram illustrating an example of a wireless communication network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
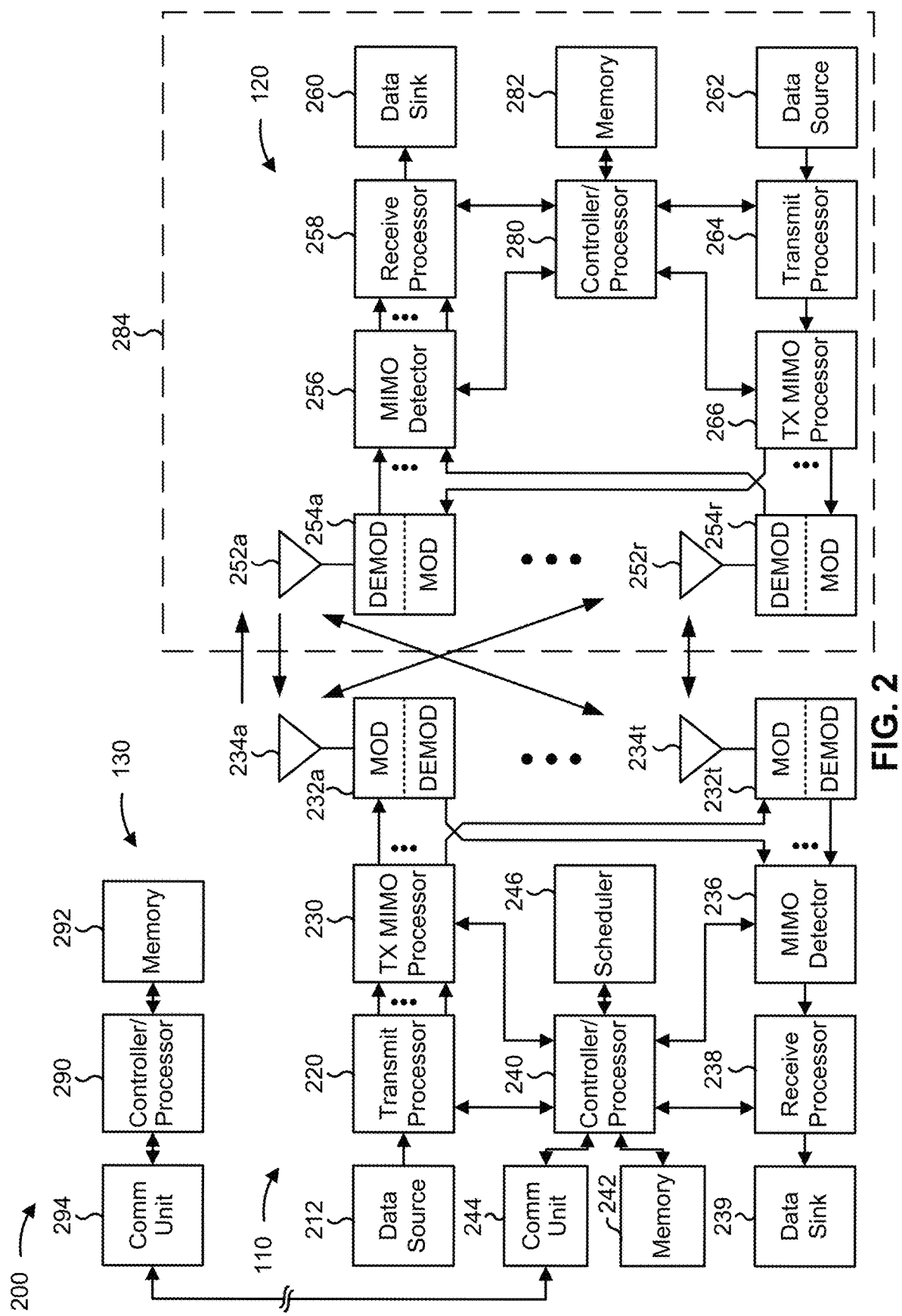
FIG. 2 is a diagram illustrating an example of a base station (BS) in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2. On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3A-3E, 4, and/or 5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3A-3E, 4, and/or 5.

Controller/processor 240 of base station 110, controller/processor 280 of UE 120, and/or any other component(s) of FIG. 2 may perform one or more techniques associated with initial subband configuration for full duplex, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving a system information block (SIB) indicating a plurality of subband configurations, means for identifying, based at least in part on one or more of the plurality of subband configurations, one or more uplink subbands in a time division duplexing (TDD) component carrier and one or more downlink subbands in the TDD component carrier, wherein the one or more uplink subbands and the one or more downlink subbands are frequency division duplexed within the TDD component carrier, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a SIB indicating a plurality of subband configurations, wherein the plurality of subband configurations indicate one or more uplink subbands in a TDD component carrier and one or more downlink subbands in the TDD component carrier, wherein the one or more uplink subbands and the one or more downlink subbands are frequency division duplexed within the TDD component carrier, means for transmitting the SIB indicating the plurality of subband configurations, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Wireless communication devices (e.g., BSs, UEs, and/or the like) may be configured to communicate in an unpaired frequency spectrum. Unlike a paired frequency spectrum, an unpaired frequency spectrum may not include paired component carriers across which downlink resources and uplink resources are frequency division duplexed. Instead, downlink resources and uplink resources are time division duplexed within component carriers in an unpaired frequency spectrum. A UE that communicates on a TDD component carrier (e.g., a component carrier in which downlink resources and uplink resources are time division duplexed) may be transmit power limited in that total transmit power for the UE is determined over time rather than over frequency bandwidth. Moreover, a UE that communicates on a TDD component carrier may experience increased latency as the UE may have to wait multiple slots for a scheduled uplink resource before the UE may transmit. The increased latency can lead to delays in hybrid automatic repeat request (HARQ) feedback, delays in retransmissions of downlink communications, and/or the like, which can decrease wireless communication reliability.

Some aspects described herein provide techniques and apparatuses for initial subband configuration for full duplex. In some aspects, a BS (e.g., BS 110) configures a plurality of frequency division duplexed subbands within a TDD component carrier. In this way, a downlink subband and an uplink subband may be frequency division duplexed within a TDD component carrier, which permits the BS and a UE (e.g., UE 120) to communicate across downlink resources and uplink resources in a manner that reduces latency (e.g., the UE may provide HARQ feedback to the BS quicker than if the downlink resources and the uplink resources were time division duplexed), permits the UE to transmit across a plurality of consecutive uplink resources (which increases the total transmit power of the UE, as the UE's transmit power is accumulated across time), and/or the like. Moreover, the BS may configure the plurality of subband configurations such that the BS and/or the UE is permitted to communicate in full duplex across the plurality of frequency division duplexed subbands, which increases throughput for the BS and/or the UE and/or further decreases latency for the BS and/or the UE.

In some aspects, the BS may configure a plurality of subband configurations for various scenarios and connectivity modes of the BS and the UE. For example, the BS may configure a plurality of subband configurations for initial access with the BS (e.g., during a random access channel (RACH) procedure with the BS) prior to radio resource control (RRC) configuration of the UE, may configure another plurality of subband configurations for initial access with the BS after RRC configuration of the UE, and/or the like. This increases the flexibility in configuring subband configurations for frequency division duplexed subbands within a TDD component carrier. To configure the UE to use a plurality of frequency division duplexed subbands within a TDD component carrier prior to RRC configuration of the UE, the BS may configure a SIB to indicate a plurality of subband configurations for the plurality of frequency division duplexed subbands. The UE may read the SIB to identify the plurality of subband configurations and may identify the plurality of frequency division duplexed subbands based at least in part on the plurality of subband configurations.

In some cases, the available overhead in the SIB to indicate the plurality of subband configurations may be limited, as the SIB may be broadcasted and/or multicasted and large increases in the size of the SIB may result in a significant increase in radio resource consumption to broadcast and/or multicast the SIB. Accordingly, the BS may use various techniques to indicate the plurality of subband configurations while maintaining a relatively low overhead for the SIB. For example, the BS may configure the SIB to indicate a location and bandwidth parameter (e.g., locationandbandwidth in an information element in the SIB) for each subband configuration. The location and bandwidth parameter for a subband configuration may include an integer value or resource indication value (RIV) indicator from which the UE may determine a frequency location (e.g., a starting resource block, an ending resource block, or a center resource block) and subband bandwidth for an associated subband. In this way, the BS may configure the SIB to indicate a location and bandwidth parameter for each of a plurality of frequency division duplexed subbands within a TDD component carrier, which may occupy less overhead than explicitly indicating the frequency location and subband bandwidth for each of the plurality of frequency division duplexed subbands.

FIGS. 3A-3E are diagrams illustrating one or more examples 300 of initial subband configuration for full duplex, in accordance with various aspects of the present disclosure. As shown in FIGS. 3A-3E, example(s) 300 may include communication between a BS 110 (e.g., a BS 110 illustrated and described above in connection with one or more of FIGS. 1 and/or 2) and a UE 120 (e.g., a UE 120 illustrated and described above in connection with one or more of FIGS. 1 and/or 2). The BS 110 and the UE 120 may be included in a wireless network, such as wireless network 100. The BS 110 and the UE 120 may communicate on a wireless access link, which may include an uplink and a downlink.

Figure 3A:
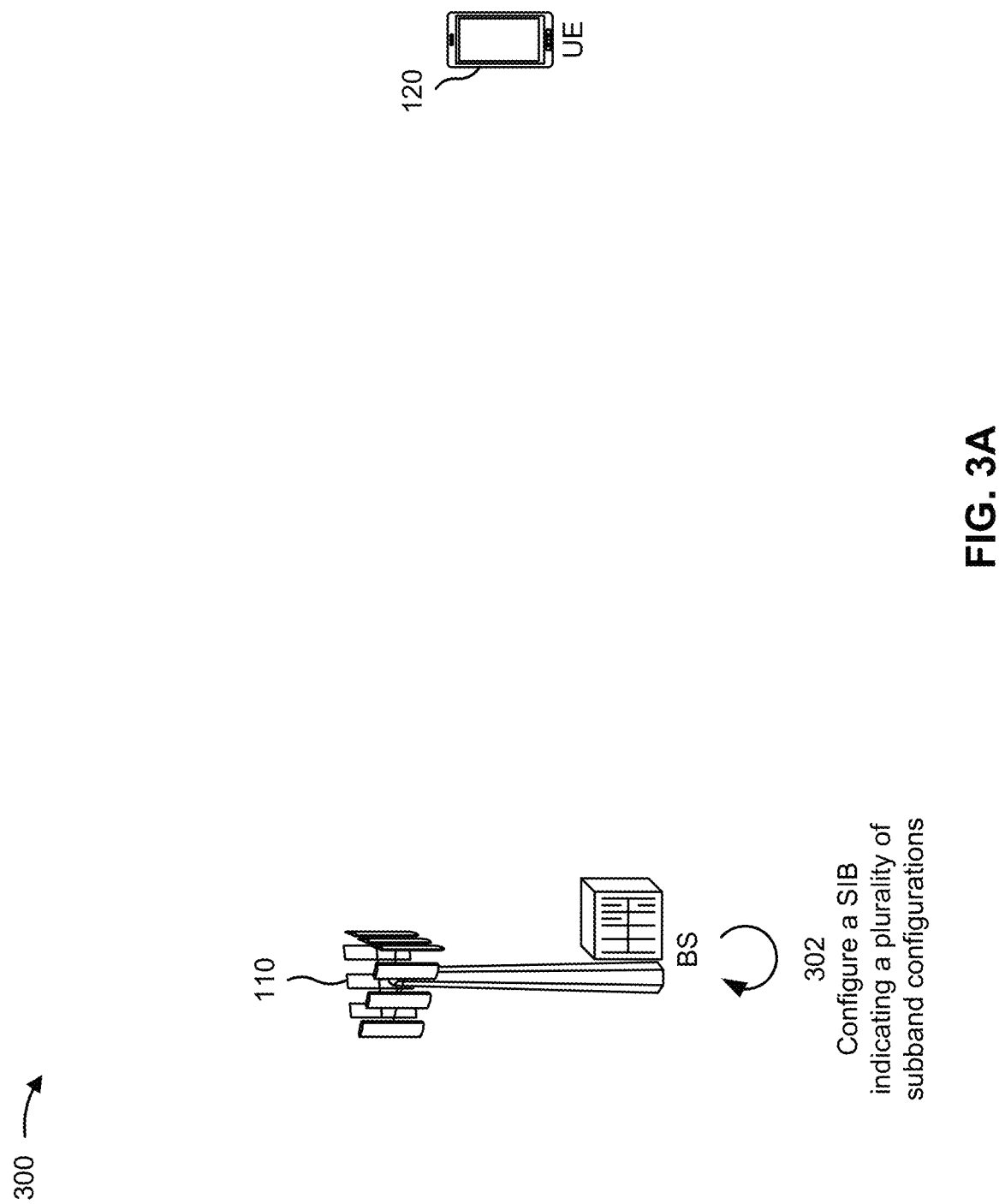
FIGS. 3A-3E are diagrams illustrating one or more examples of initial subband configuration for full duplex, in accordance with the present disclosure.

As shown in FIG. 3A, and by reference number 302, the BS 110 may configure a SIB indicating a plurality of subband configurations. The plurality of subband configurations may indicate one or more uplink subbands and one or more downlink subbands that are frequency division multiplexed within a TDD component carrier. The one or more uplink subbands and the one or more downlink subbands may be used for initial access with the BS 110. In some aspects, the indication of the plurality of subband configurations may be included in the SIB along with an indication of an initial downlink bandwidth part (BWP) (e.g., in a BWP-DownlinkCommon information element) and an initial uplink BWP (e.g., in a BWP-UplinkCommon information element) for initial access with the BS 110.

In some aspects, the BS 110 may configure the SIB to indicate a subband configuration by configuring the SIB to include an indication of a location and bandwidth parameter for the subband configuration. The location and bandwidth parameter may be indicated in a field (e.g., a location and bandwidth parameter field, a locationAndBandwidth information element, and/or the like) in the SIB. The location and bandwidth parameter for a subband configuration may indicate an integer value or RIV indicator within a particular range (e.g., [0, 37949] or another range). The UE 120 may use the integer value or RIV indicator to derive a frequency location and subband bandwidth for a subband associated with the subband configuration. In some aspects, the BS 110 determines the integer value or RIV indicator for a subband based at least in part on the frequency location and the subband bandwidth for the subband. For example, the BS 110 may determine the integer value or RIV indicator based at least in part on Equation 1:

$$RIV_{SB} = N_{BWP}^{size}(L_{RBs}-1) + RB_{FL} \qquad \text{Equation 1}$$

where $RIV_{SB}$ is the integer value or RIV indicator for the subband, $N_{BWP}^{size}$ is the total system bandwidth configured for the BS 110 for initial access, $L_{RBs}$ is the subband bandwidth for the subband, and $RB_{FL}$ is the resource block associated with the frequency location of the subband. The frequency location of the subband may correspond to the starting resource block of the subband in the frequency domain, the ending resource block of the subband in the frequency domain, or the center resource block of the subband in the frequency domain. In some cases, the total system bandwidth configured for the BS 110 for initial access ($N_{BWP}^{size}$) may not be known to the UE 120. In these cases, the UE 120 may determine $N_{BWP}^{size}$ as a quantity of resource blocks corresponding to the maximum permitted system bandwidth in the wireless network (e.g., 275 resource blocks or another quantity of resource blocks).

As another example, the BS 110 may determine the integer value or RIV indicator based at least in part on Equation 2:

$$RIV_{SB}=N_{BWP}{}^{size}(N_{BWP}{}^{size}-L_{RBs}-1)+(N_{BWP}{}^{size}-1-RB_{FL})$$ Equation 2

In some aspects, the BS 110 may determine whether to use Equation 1 or Equation 2 to determine the integer value or RIV indicator for a subband based at least in part on the subband bandwidth for the subband. For example, the BS 110 determine to use Equation 1 if the subband bandwidth for the subband is less than or equal to half the total system bandwidth configured for the BS 110 for initial access (e.g., if $(L_{RBs}-1) \leq [N_{BWP}{}^{size}/2]$). As another example, the BS 110 determine to use Equation 2 if the subband bandwidth for the subband is greater than half the total system bandwidth configured for the BS 110 for initial access (e.g., if $(L_{RBs}-1)>[N_{BWP}{}^{size}/2]$).

In some aspects, the BS 110 may configure the SIB to indicate the plurality of subband configurations using various techniques. As an example, the BS 110 may configure a plurality of location and bandwidth parameter fields, where each location and bandwidth parameter field indicates a respective location and bandwidth parameter for an associated subband configuration. As another example, the BS 110 may configure a single location and bandwidth parameter field, which may include a plurality of sub-fields. Each sub-field in the location and bandwidth parameter field may indicate a respective location and bandwidth parameter for an associated subband configuration. In these examples, the sub-fields may be ordered in the location and bandwidth parameter field according to subband configuration type (e.g., uplink subband configurations may be ordered before downlink subband configurations or vice-versa).

As another example, the BS 110 may configure an uplink location and bandwidth parameter field and a separate location and bandwidth parameter field in the SIB. In these cases, the BS 110 may configure the uplink location and bandwidth parameter field to include one or more sub-fields, where each sub-field indicates a respective location and bandwidth parameter for an uplink subband configuration of the plurality of subband configurations. Similarly, the BS 110 may configure the downlink location and bandwidth parameter field to include one or more sub-fields, where each sub-field indicates a respective location and bandwidth parameter for a downlink subband configuration of the plurality of subband configurations.

Figure 3B:
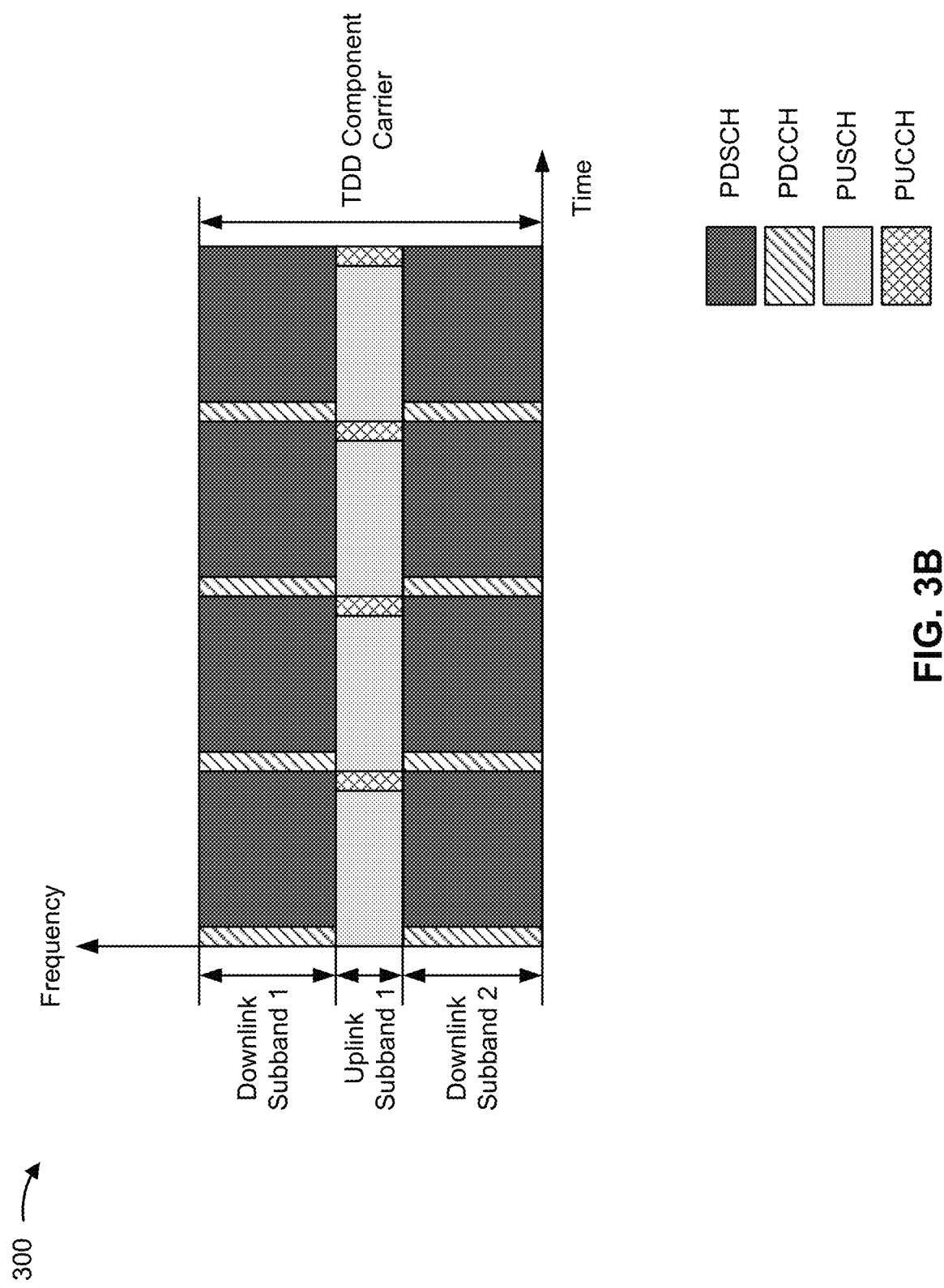
Figure 3C:
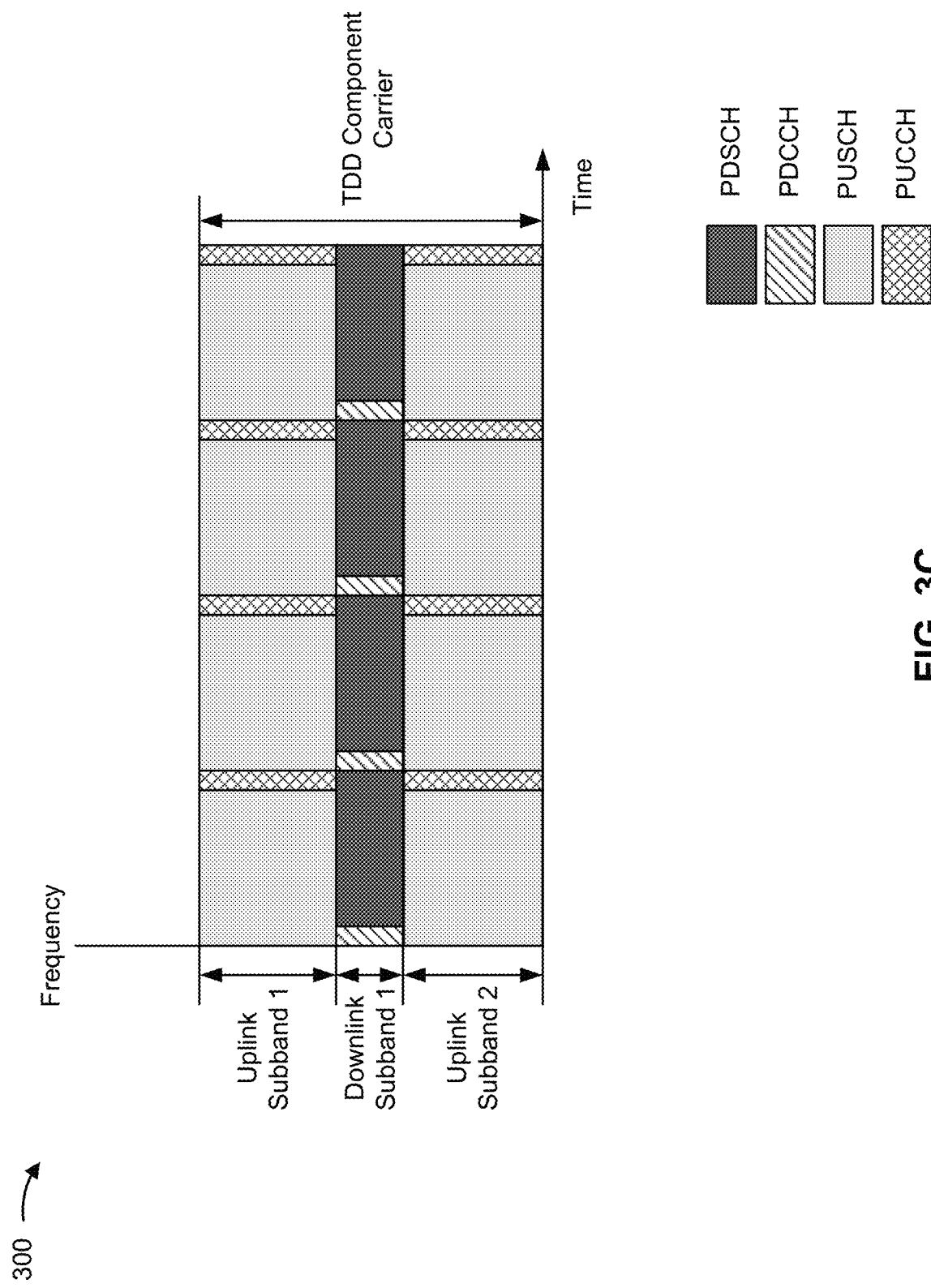

FIGS. 3B and 3C illustrate example configurations of frequency division duplexed subbands within a TDD component carrier. Other example configurations of frequency division duplexed subbands within a TDD component carrier may be configured by the BS 110 (and other BSs) and/or used by the BS 110 and the UE 120 for communication prior to RRC configuration of the UE 120. For example, other example configurations of frequency division duplexed subbands within a TDD component carrier may include greater or fewer downlink subbands and/or greater or fewer uplink subbands. As another example, other example configurations of frequency division duplexed subbands within a TDD component carrier may include different configurations of physical downlink shared channel (PDSCH) resources (e.g., time domain resources and/or frequency domain resources), physical downlink control channel (PDCCH) resources, physical uplink shared channel (PUSCH) resources, physical uplink control channel (PUCCH) resources, and/or other types of resources.

As shown in FIG. 3B, an example configuration of frequency division duplexed subbands within a TDD component carrier may include a plurality of downlink subbands (e.g., downlink subband 1 and downlink subband 2) and an uplink subband within the bandwidth of the TDD component carrier. Each of the downlink subbands and the uplink subband may be indicated by a respective subband configuration in a SIB. The subband configuration for each of the downlink subbands and the uplink subband may indicate a frequency location and a subband bandwidth. For example, the subband configuration for downlink subband 1 may indicate a frequency location and a subband bandwidth for downlink subband 1, the subband configuration for downlink subband 2 may indicate a frequency location and a subband bandwidth for downlink subband 2, and the subband configuration for the uplink subband may indicate a frequency location and a subband bandwidth for the uplink subband.

As further shown in FIG. 3B, the downlink subbands and the uplink subband may include different types of channels time division duplexed within the downlink subbands and the uplink subband. For example, downlink subband 1 and downlink subband 2 may each include a plurality of time division multiplexed PDSCH slots and/or symbols and a plurality of time division multiplexed PDCCH slots and/or symbols. As another example, the uplink subband may include a plurality of time division multiplexed PUSCH slots and/or symbols and a plurality of time division multiplexed PUCCH slots and/or symbols.

In some aspects, the BS 110 and/or the UE 120 may use the example configuration of frequency division duplexed subbands illustrated in FIG. 3B for full duplex communication. In these cases, the BS 110 may use downlink subband 1 to transmit downlink communications to the UE 120, may use the uplink subband to receive uplink communications from the UE 120, and/or may use downlink subband 2 to communicate with another UE. For example, the BS 110 may transmit a downlink communication to UE 120 in downlink subband 1 while simultaneously receiving an uplink communication from the UE 120 in the uplink subband. As another example, the BS 110 may transmit a downlink communication to another UE in downlink subband 2 while simultaneously receiving an uplink communication from the UE 120 in the uplink subband.

As shown in FIG. 3C, an example configuration of frequency division duplexed subbands within a TDD component carrier may include a plurality of uplink subbands (e.g., uplink subband 1 and uplink subband 2) and a downlink subband within the bandwidth of the TDD component carrier. Each of the uplink subbands and the downlink subband may be indicated by a respective subband configuration in a SIB. The subband configuration for each of the uplink subbands and the downlink subband may indicate a frequency location and a subband bandwidth. For example, the subband configuration for uplink subband 1 may indicate a frequency location and a subband bandwidth for uplink subband 1, the subband configuration for uplink subband 2 may indicate a frequency location and a subband bandwidth for uplink subband 2, and the subband configuration for the downlink subband may indicate a frequency location and a subband bandwidth for the downlink subband.

As further shown in FIG. 3C, the uplink subbands and the downlink subband may include different types of channels time division duplexed within the uplink subbands and the downlink subband. For example, uplink subband 1 and uplink subband 2 may each include a plurality of time division duplexed PUSCH slots and/or symbols and a plurality of time division multiplexed PUCCH slots and/or symbols. As another example, the downlink subband may include a plurality of time division duplexed PDSCH slots and/or symbols and a plurality of time division multiplexed PDCCH slots and/or symbols.

In some aspects, the BS 110 and/or the UE 120 may use the example configuration of frequency division duplexed subbands illustrated in FIG. 3C for full duplex communication. In these cases, the UE 120 may use uplink subband 1 and uplink subband 2 to transmit uplink communications to the BS 110, and may use the downlink subband to receive downlink communications from the BS 110. For example, the UE 120 may receive a downlink communication from the BS 110 in the downlink subband while simultaneously transmitting an uplink communication to the BS 110 in uplink subband 1 or uplink subband 2. In some aspects, the UE 120 may transmit uplink communications to BS 110 with repetition across uplink subband 1 and uplink subband 2 for frequency transmit diversity. As an example, the UE 120 may transmit one or more repetitions of an uplink communication on uplink subband 1 and may transmit one or more repetitions of the uplink communication on uplink subband 2.

Figure 3D:
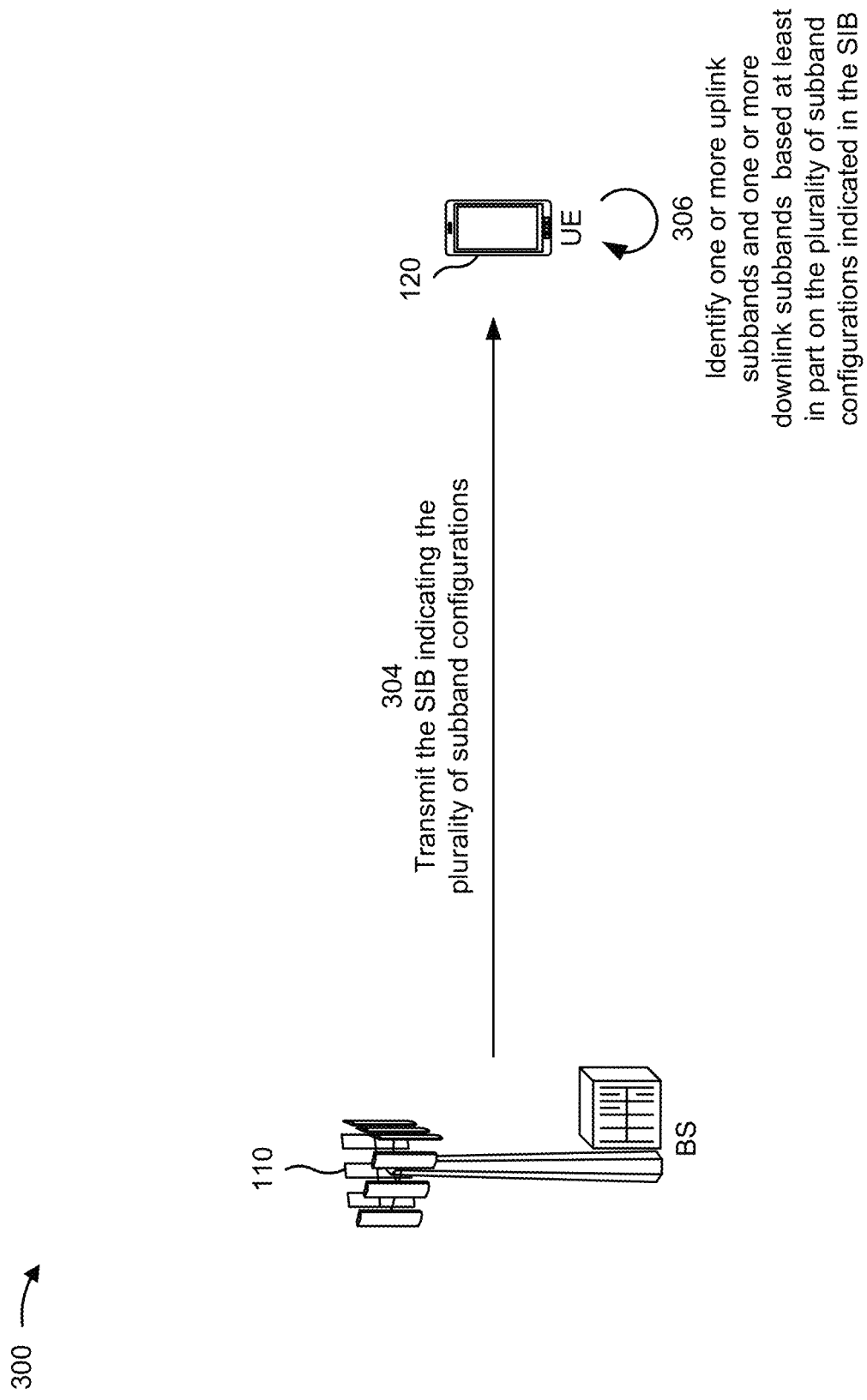

As shown in FIG. 3D, and by reference number 304, the BS 110 may transmit the SIB indicating the plurality of subband configurations to the UE 120. In some aspects, the BS 110 broadcasts or multicasts the SIB to the UE 120 and other UEs in the wireless network. The UE 120 may receive the SIB prior to being RRC configured by the BS 110. In some aspects, the UE 120 may receive the SIB prior to initiating an initial access procedure (e.g., a RACH procedure) with the BS 110, during the initial access procedure, and/or the like.

As further shown in FIG. 3D, and by reference number 306, the UE 120 may identify the one or more uplink subbands and the one or more downlink subbands that are frequency division multiplexed within the TDD component carrier based at least in part on the plurality of subband configurations indicated in the SIB. In some aspects, the UE 120 may further identify the bandwidth (e.g., the BWP) for the TDD component carrier based at least in part on an initial downlink BWP and an initial uplink BWP indicated by the SIB.

The UE 120 may identify a subband based at least in part on identifying an associated subband configuration indicated in the SIB. For example, the UE 120 may identify the subband configuration in a location and bandwidth field, an uplink location and bandwidth field, or a downlink location and bandwidth field in the SIB. The UE 120 may identify the integer value or RIV indicator included in the subband configuration, and the UE may determine the frequency location and the subband bandwidth of the subband based at least in part on the integer value or RIV indicator and Equation 1 or Equation 2 above. For example, the UE 120 may perform a modulo operation of $RIV_{SB}$ and $N_{BWP}^{size}$ from Equation 1 to derive the value of $RB_{FL}$, which corresponds to the frequency location of the subband (e.g., the starting resource block, the ending resource block, or the center resource block). As another example, the UE 120 perform a floor division of $RIV_{SB}$ by $N_{BWP}^{size}$, and may subtract $RB_{FL}$ and add 1 to the quotient to obtain $L_{RBs}$, which corresponds to the subband bandwidth of the subband.

Once $RB_{FL}$ and $L_{RB}$s are determined, the UE 120 may determine the upper frequency and the lower frequency of the subband. For example, if the frequency location indicates the starting resource block of the subband, the UE 120 may determine the lower frequency of the subband as the starting frequency of the starting resource block, and may determine the upper frequency based at least in part on adding the subband bandwidth to the lower frequency. As another example, if the frequency location indicates the ending resource block of the subband, the UE 120 may determine the upper frequency of the subband as the ending frequency of the ending resource block, and may determine the lower frequency based at least in part on subtracting the subband bandwidth from the upper frequency. As another example, if the frequency location indicates the center resource block of the subband, the UE 120 may determine the upper frequency and the lower frequency such that the center resource block corresponds to the center of the subband bandwidth (e.g., such that the upper frequency and the lower frequency are equally spaced from the center resource block).

Figure 3E:
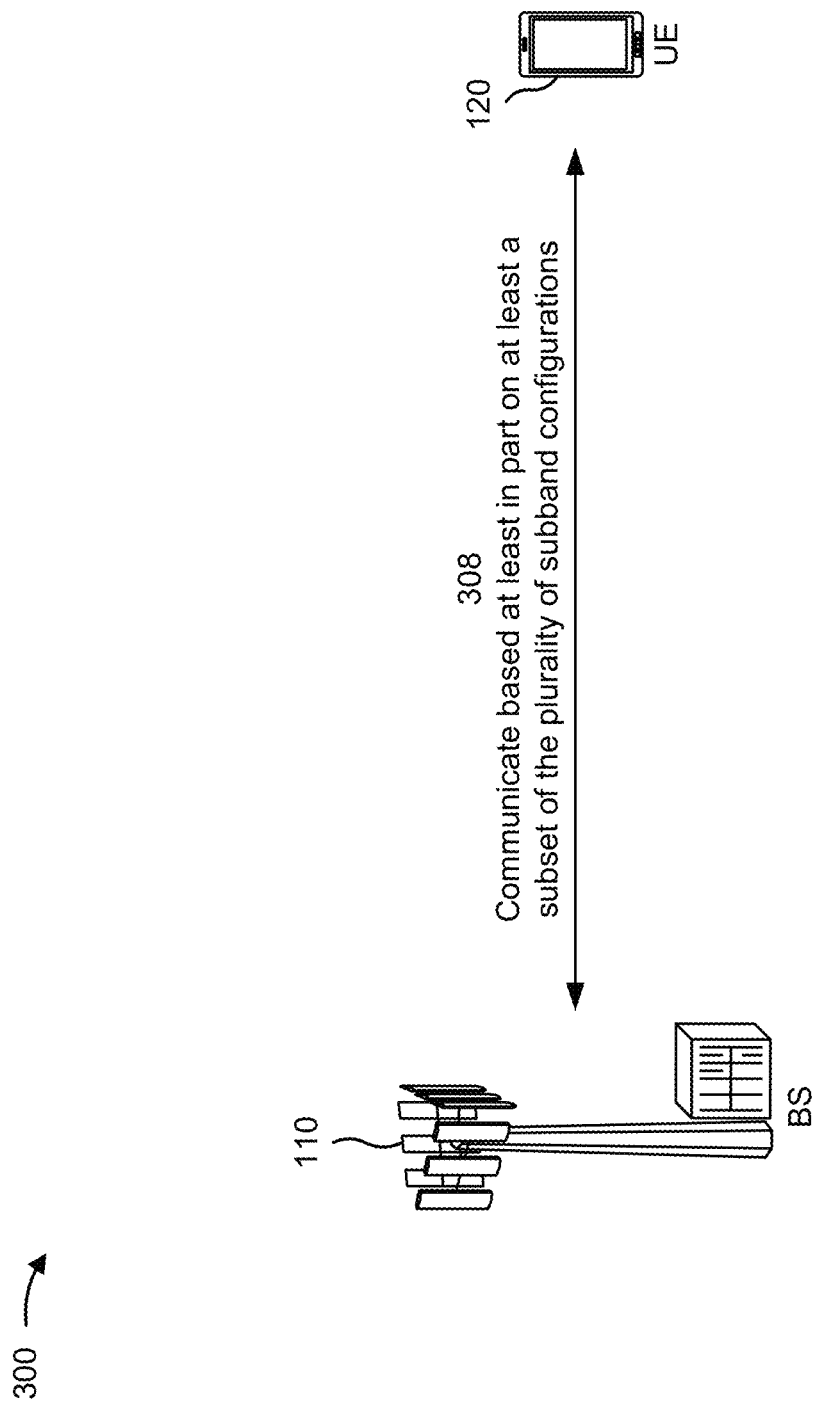

As shown in FIG. 3E, and by reference number 308, the BS 110 and the UE 120 may communicate based at least in part on at least a subset of the uplink subband(s) and the downlink subband(s) frequency division multiplexed in the TDD component carrier. For example, the BS 110 may transmit downlink communications to the UE 120 in a downlink subband and/or may receive uplink communications from the UE 120 in an uplink subband. As another example, the UE 120 may transmit uplink communications to the BS 110 in an uplink subband and/or may receive downlink communications from the BS 110 in a downlink subband.

In some aspects, the BS 110 and/or the UE 120 may communicate using at least a subset of the uplink subband(s) and the downlink subband(s) in a full duplex communication mode. For example, the BS 110 may transmit a downlink communication to UE 120 in a downlink subband while simultaneously receiving an uplink communication from another UE in an uplink subband. As another example, the BS 110 may transmit a downlink communication to another UE in a downlink subband while simultaneously receiving an uplink communication from the UE 120 in an uplink subband. As another example, the UE 120 may transmit an uplink communication to the BS 110 in an uplink subband while simultaneously receiving a downlink communication from the BS 110 in a downlink subband.

In this way, the BS 110 may indicate the plurality of subband configurations while maintaining a relatively low overhead for the SIB by configuring the SIB to indicate a location and bandwidth parameter for each subband configuration. The location and bandwidth parameter for a subband configuration may include an integer value or RIV indicator from which the UE 120 may determine a frequency location and subband bandwidth for an associated subband. In this way, the BS 110 may configure the SIB to indicate a location and bandwidth parameter for each of a plurality of frequency division duplexed subbands within a TDD component carrier, which may occupy less overhead than explicitly indicating the frequency location and subband bandwidth for each of the plurality of frequency division duplexed subbands.

As indicated above, FIGS. 3A-3E is provided as one or more examples. Other examples may differ from what is described with respect to FIGS. 3A-3E.

Figure 4:
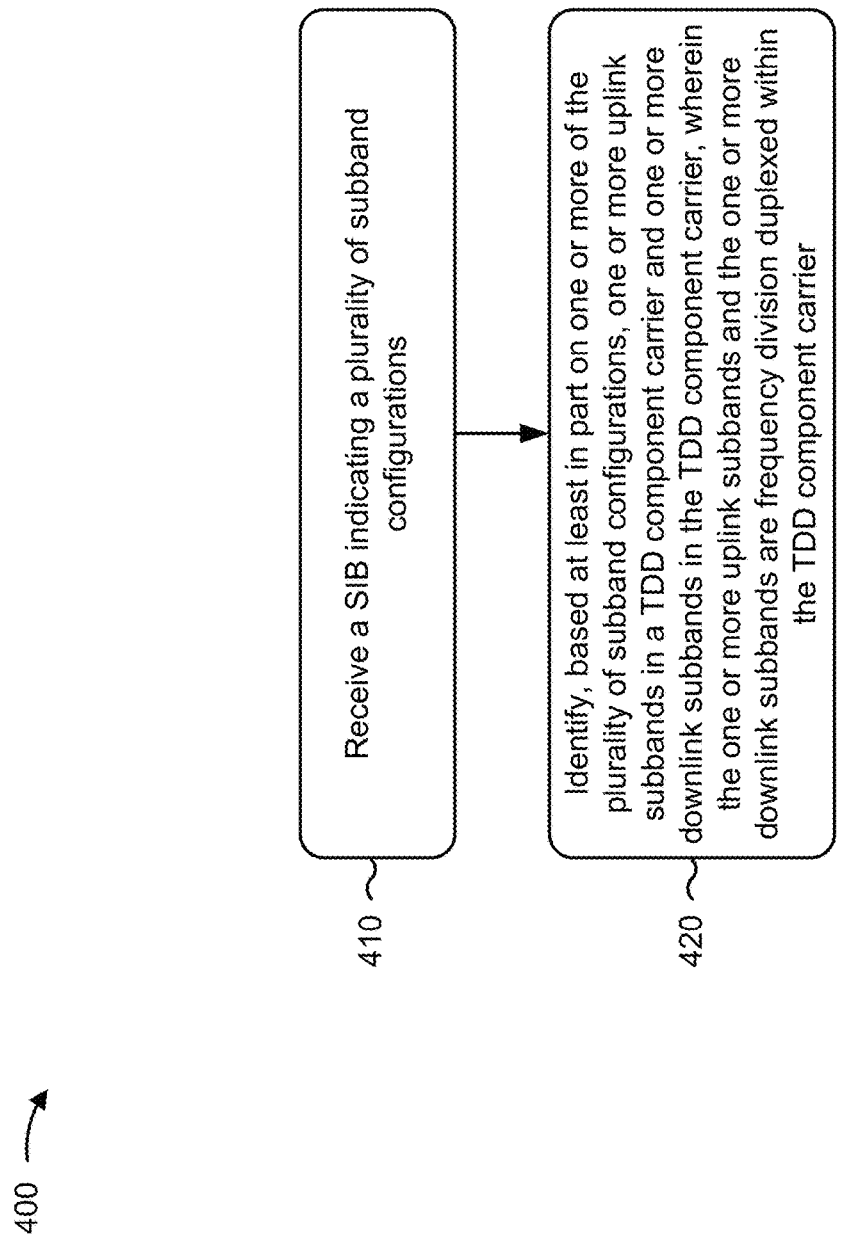
FIG. 4 is a diagram illustrating an example process performed, for example, by a UE, in accordance with the present disclosure.

FIG. 4 is a diagram illustrating an example process 400 performed, for example, by a UE, in accordance with various aspects of the present disclosure. Example process 400 is an example where the UE (e.g., UE 120 illustrated and described above in one or more of FIGS. 1, 2 and/or 3A-3E) performs operations associated with initial subband configuration for full duplex.

As shown in FIG. 4, in some aspects, process 400 may include receiving an SIB indicating a plurality of subband configurations (block 410). For example, the UE (e.g., using receive processor 258, transmit processor 264, controller/processor 280, memory 282, and/or the like) may receive an SIB indicating a plurality of subband configurations, as described above.

As further shown in FIG. 4, in some aspects, process 400 may include identifying, based at least in part on one or more of the plurality of subband configurations, one or more uplink subbands in a TDD component carrier and one or more downlink subbands in the TDD component carrier, wherein the one or more uplink subbands and the one or more downlink subbands are frequency division duplexed within the TDD component carrier (block 420). For example, the UE (e.g., using receive processor 258, transmit processor 264, controller/processor 280, memory 282, and/or the like) may identify, based at least in part on one or more of the plurality of subband configurations, one or more uplink subbands in a TDD component carrier and one or more downlink subbands in the TDD component carrier, as described above. In some aspects, the one or more uplink subbands and the one or more downlink subbands are frequency division duplexed within the TDD component carrier.

Process 400 may include additional aspects, such as any single aspect or any combination of aspects described below and/or in connection with one or more other processes described elsewhere herein.

In a first aspect, process 400 includes communicating with a BS using at least one of the one or more uplink subbands and the one or more downlink subbands. In a second aspect, alone or in combination with the first aspect, communicating with the BS using at least one of the one or more uplink subbands and the one or more downlink subbands comprises communicating, with the BS, in a full duplex communication mode. In a third aspect, alone or in combination with one or more of the first and second aspects, a subband configuration of the plurality of subband configurations indicates a location and bandwidth parameter for an associated uplink subband of the one or more uplink subbands or an associated downlink subband of the one or more downlink subbands, and identifying the one or more uplink subbands and the one or more downlink subbands comprises determining, based at least in part on the location and bandwidth parameter, a frequency location and a subband bandwidth for the associated uplink subband or the associated downlink subband.

In a fourth aspect, alone or in combination with one or more of the first through third aspects, the frequency location indicates a starting resource block for the associated uplink subband or the associated downlink subband, a center resource block for the associated uplink subband or the associated downlink subband, or an ending resource block for the associated uplink subband or the associated downlink subband. In a fifth aspect, alone or in combination with one or more of the first through fourth aspects, receiving the SIB indicating the plurality of subband configurations comprises receiving the SIB indicating the plurality of subband configurations prior to receiving a radio resource control configuration during an initial access procedure.

In a sixth aspect, alone or in combination with one or more of the first through fifth aspects, process 400 includes identifying, in the SIB, a downlink location and bandwidth parameter field and an uplink location and bandwidth parameter field, wherein the downlink location and bandwidth parameter field is indicating one or more location and bandwidth parameters for associated downlink subbands, and wherein the uplink location and bandwidth parameter field is indicating one or more location and bandwidth parameters for associated uplink subbands. In a seventh aspect, alone or in combination with one or more of the first through sixth aspects, process 400 includes identifying, in the SIB, a plurality of location and bandwidth parameter fields, wherein a location and bandwidth parameter field of the plurality of location and bandwidth parameter fields is indicating a location and bandwidth parameter for an associated downlink subband or an associated uplink subband.

In an eighth aspect, alone or in combination with one or more of the first through seventh aspects, process 400 includes identifying, in the SIB, a location and bandwidth parameter field; and identifying, based at least in part on identifying the location and bandwidth parameter field, a plurality of sub-fields associated with the location and bandwidth parameter field, wherein a sub-field of the plurality of sub-fields is indicating a location and bandwidth parameter for an associated downlink subband or an associated uplink subband.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
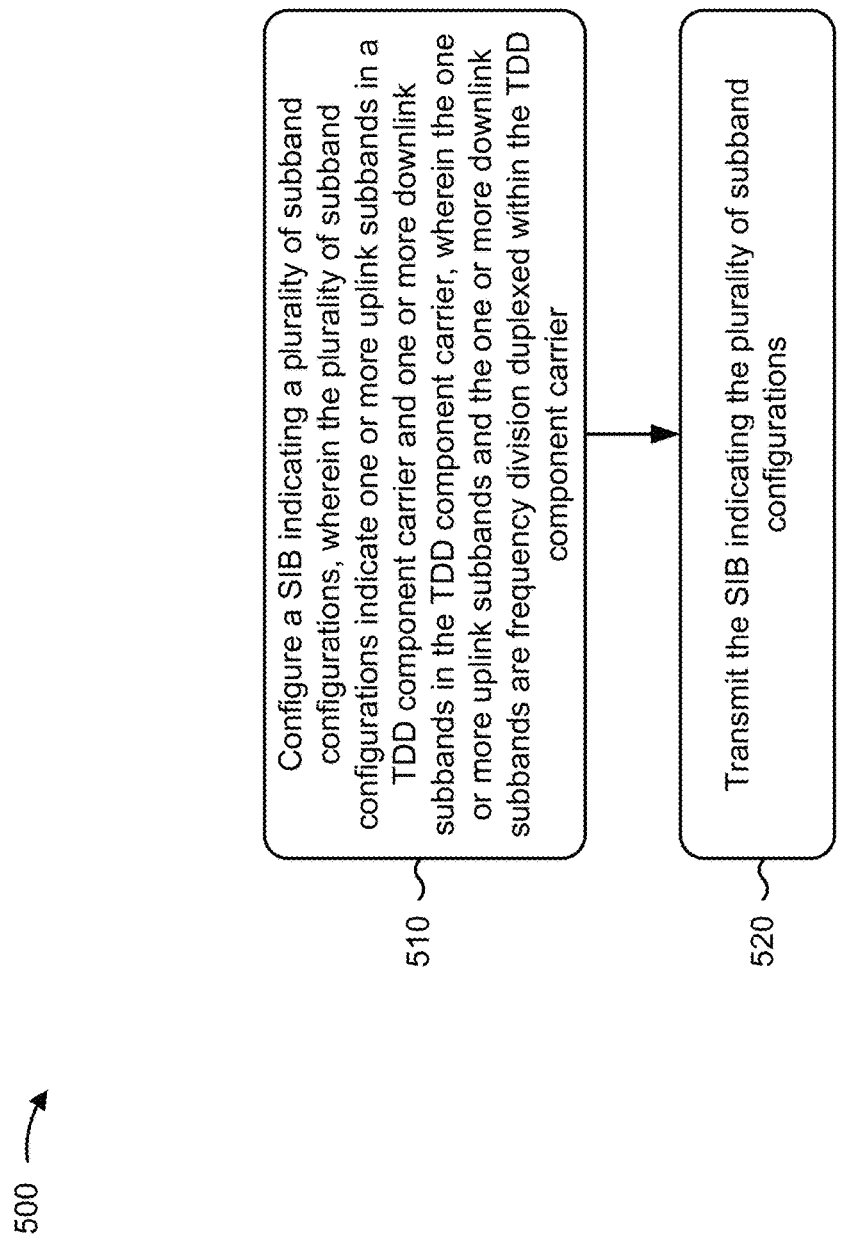
FIG. 5 is a diagram illustrating an example process performed, for example, by a BS, in accordance with the present disclosure.

FIG. 5 is a diagram illustrating an example process 500 performed, for example, by a BS, in accordance with various aspects of the present disclosure. Example process 500 is an example where the BS (e.g., BS 110 illustrated and described above in connection with one or more of FIGS. 1, 2, and/or 3A-3E) performs operations associated with initial subband configuration for full duplex.

As shown in FIG. 5, in some aspects, process 500 may include configuring a SIB indicating a plurality of subband configurations, wherein the plurality of subband configurations indicate one or more uplink subbands in a TDD component carrier and one or more downlink subbands in the TDD component carrier, and wherein the one or more uplink subbands and the one or more downlink subbands are frequency division duplexed within the TDD component carrier (block 510). For example, the BS (e.g., using transmit processor 220, receive processor 238, controller/processor 240, memory 242, and/or the like) may configure a SIB indicating a plurality of subband configurations, as described above. In some aspects, the plurality of subband configurations indicate one or more uplink subbands in a TDD component carrier and one or more downlink subbands in the TDD component carrier. In some aspects, the one or more uplink subbands and the one or more downlink subbands are frequency division duplexed within the TDD component carrier.

As further shown in FIG. 5, in some aspects, process 500 may include transmitting the SIB indicating the plurality of subband configurations (block 520). For example, the BS (e.g., using transmit processor 220, receive processor 238, controller/processor 240, memory 242, and/or the like) may transmit the SIB indicating the plurality of subband configurations, as described above.

Process 500 may include additional aspects, such as any single aspect or any combination of aspects described below and/or in connection with one or more other processes described elsewhere herein.

In a first aspect, process 500 includes communicating with a UE using at least one of the one or more uplink subbands and the one or more downlink subbands. In a second aspect, alone or in combination with the first aspect, communicating with the UE using at least one of the one or more uplink subbands and the one or more downlink subbands comprises communicating, with the UE, in a full duplex communication mode. In a third aspect, alone or in combination with one or more of the first and second aspects, a subband configuration, of the plurality of subband configurations, indicates a location and bandwidth parameter for an associated uplink subband of the one or more uplink subbands or an associated downlink subband of the one or more downlink subbands, and configuring the SIB indicating the plurality of subband configurations comprises determining the location and bandwidth parameter based at least in part on a frequency location and a subband bandwidth for the associated uplink subband or the associated downlink subband.

In a fourth aspect, alone or in combination with one or more of the first through third aspects, the frequency location indicates at least one of a starting resource block for the associated uplink subband or the associated downlink subband, a center resource block for the associated uplink subband or the associated downlink subband, or an ending resource block for the associated uplink subband or the associated downlink subband. In a fifth aspect, alone or in combination with one or more of the first through fourth aspects, transmitting the SIB indicating the plurality of subband configurations comprises: transmitting the SIB indicating the plurality of subband configurations prior to transmitting a radio resource control configuration during an initial access procedure.

In a sixth aspect, alone or in combination with one or more of the first through fifth aspects, process 500 includes configuring, in the SIB, a downlink location and bandwidth parameter field and an uplink location and bandwidth parameter field, wherein the downlink location and bandwidth parameter field is indicating one or more location and bandwidth parameters for associated downlink subbands, and wherein the uplink location and bandwidth parameter field is indicating one or more location and bandwidth parameters for associated uplink subbands. In a seventh aspect, alone or in combination with one or more of the first through sixth aspects, process 500 includes configuring, in the SIB, a plurality of location and bandwidth parameter fields, wherein a location and bandwidth parameter field of the plurality of location and bandwidth parameter fields is indicating a location and bandwidth parameter for an associated downlink subband or an associated uplink subband.

In an eighth aspect, alone or in combination with one or more of the first through seventh aspects, process 500 includes configuring, in the SIB, a location and bandwidth parameter field; and configuring, in the SIB, a plurality of sub-fields associated with the location and bandwidth parameter field, wherein a sub-field of the plurality of sub-fields is indicating a location and bandwidth parameter for an associated downlink subband or an associated uplink subband.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving a system information block (SIB) indicating a plurality of subband configurations; and identifying, based at least in part on one or more of the plurality of subband configurations: one or more uplink subbands in a time division duplexing (TDD) component carrier, and one or more downlink subbands in the TDD component carrier, wherein the one or more uplink subbands and the one or more downlink subbands are frequency division duplexed within the TDD component carrier.

Aspect 2: The method of Aspect 1, further comprising: communicating with a base station (BS) using at least one of the one or more uplink subbands and the one or more downlink subbands. Aspect 3: The method of Aspect 2, wherein communicating with the BS using at least one of the one or more uplink subbands and the one or more downlink subbands comprises: communicating, with the BS, in a full duplex communication mode. Aspect 4: The method of any of Aspects 1-3, wherein a subband configuration of the plurality of subband configurations indicates a location and bandwidth parameter for an associated uplink subband of the one or more uplink subbands or an associated downlink subband of the one or more downlink subbands; and wherein identifying the one or more uplink subbands and the one or more downlink subbands comprises: determining, based at least in part on the location and bandwidth parameter, a frequency location and a subband bandwidth for the associated uplink subband or the associated downlink subband.

Aspect 5: The method of Aspect 4, wherein the frequency location indicates: a starting resource block for the associated uplink subband or the associated downlink subband, a center resource block for the associated uplink subband or the associated downlink subband, or an ending resource block for the associated uplink subband or the associated downlink subband. Aspect 6: The method of any of Aspects 1-5, wherein receiving the SIB indicating the plurality of subband configurations comprises: receiving the SIB indicating the plurality of subband configurations prior to receiving a radio resource control configuration during an initial access procedure.

Aspect 7: The method of any of Aspects 1-6, further comprising: identifying, in the SIB, a downlink location and bandwidth parameter field and an uplink location and bandwidth parameter field, wherein the downlink location and bandwidth parameter field indicates one or more location and bandwidth parameters for associated downlink subbands, and wherein the uplink location and bandwidth parameter field indicates one or more location and bandwidth parameters for associated uplink subbands. Aspect 8: The method of any of Aspects 1-7, further comprising: identifying, in the SIB, a plurality of location and bandwidth parameter fields, wherein a location and bandwidth parameter field of the plurality of location and bandwidth parameter fields indicates a location and bandwidth parameter for an associated downlink subband or an associated uplink subband.

Aspect 9: The method of any of Aspects 1-8, further comprising: identifying, in the SIB, a location and bandwidth parameter field; and identifying, based at least in part on identifying the location and bandwidth parameter field, a plurality of sub-fields associated with the location and bandwidth parameter field, wherein a sub-field of the plurality of sub-fields indicates a location and bandwidth parameter for an associated downlink subband or an associated uplink subband.

Aspect 10: A method of wireless communication performed by a base station (BS), comprising: configuring a system information block (SIB) indicating a plurality of subband configurations, wherein the plurality of subband configurations indicate: one or more uplink subbands in a time division duplexing (TDD) component carrier, and one or more downlink subbands in the TDD component carrier, wherein the one or more uplink subbands and the one or more downlink subbands are frequency division duplexed within the TDD component carrier; and transmitting the SIB indicating the plurality of subband configurations.

Aspect 11: The method of Aspect 10, further comprising: communicating with a user equipment (UE) using at least one of the one or more uplink subbands and the one or more downlink subbands. Aspect 12: The method of Aspect 11, wherein communicating with the UE using at least one of the one or more uplink subbands and the one or more downlink subbands comprises: communicating, with the UE, in a full duplex communication mode.

Aspect 13: The method of any of Aspects 10-12, wherein a subband configuration, of the plurality of subband configurations, indicates a location and bandwidth parameter for an associated uplink subband of the one or more uplink subbands or an associated downlink subband of the one or more downlink subbands; and wherein configuring the SIB indicating the plurality of subband configurations comprises: determining the location and bandwidth parameter based at least in part on a frequency location and a subband bandwidth for the associated uplink subband or the associated downlink subband. Aspect 14: The method of Aspect 13, wherein the frequency location indicates at least one of: a starting resource block for the associated uplink subband or the associated downlink subband, a center resource block for the associated uplink subband or the associated downlink subband, or an ending resource block for the associated uplink subband or the associated downlink subband.

Aspect 15: The method of any of Aspects 10-14, wherein transmitting the SIB indicating the plurality of subband configurations comprises: transmitting the SIB indicating the plurality of subband configurations prior to transmitting a radio resource control configuration during an initial access procedure. Aspect 16: The method of any of Aspects 10-15, further comprising: configuring, in the SIB, a downlink location and bandwidth parameter field and an uplink location and bandwidth parameter field, wherein the downlink location and bandwidth parameter field indicates one or more location and bandwidth parameters for associated downlink subbands, and wherein the uplink location and bandwidth parameter field indicates one or more location and bandwidth parameters for associated uplink subbands.

Aspect 17: The method of any of Aspects 10-16, further comprising: configuring, in the SIB, a plurality of location and bandwidth parameter fields, wherein a location and bandwidth parameter field of the plurality of location and bandwidth parameter fields indicates a location and bandwidth parameter for an associated downlink subband or an associated uplink subband. Aspect 18: The method of any of Aspects 10-17, further comprising: configuring, in the SIB, a location and bandwidth parameter field; and configuring, in the SIB, a plurality of sub-fields associated with the location and bandwidth parameter field, wherein a sub-field of the plurality of sub-fields indicates a location and bandwidth parameter for an associated downlink subband or an associated uplink subband.

Aspect 19: An apparatus for wireless communication at a device, comprising a processor; memory coupled with the processor; and instructions stored in the memory and executable by the processor to cause the apparatus to perform the method of one or more of Aspects 1-9. Aspect 20: A device for wireless communication, comprising a memory and one or more processors coupled to the memory, the memory and the one or more processors configured to perform the method of one or more of Aspects 1-9.

Aspect 21: An apparatus for wireless communication, comprising at least one means for performing the method of one or more of Aspects 1-9. Aspect 22: A non-transitory computer-readable medium storing code for wireless communication, the code comprising instructions executable by a processor to perform the method of one or more of Aspects 1-9. Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18. Aspect 25: A device for wireless communication, comprising a memory and one or more processors coupled to the memory, the memory and the one or more processors configured to perform the method of one or more of Aspects 10-18.

Aspect 26: An apparatus for wireless communication, comprising at least one means for performing the method of one or more of Aspects 10-18. Aspect 27: A non-transitory computer-readable medium storing code for wireless communication, the code comprising instructions executable by a processor to perform the method of one or more of Aspects 10-18. Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description, but is not intended to be exhaustive or to limit the aspects to the precise form disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a system information block (SIB) indicating a plurality of subband configurations; and
   identifying, based at least in part on one or more of the plurality of subband configurations:
      one or more uplink subbands in a time division duplexing (TDD) component carrier, and
      one or more downlink subbands in the TDD component carrier,
         wherein the one or more uplink subbands and the one or more downlink subbands are frequency division duplexed within the TDD component carrier.

2. The method of claim 1, further comprising:
   communicating with a network entity using at least one of the one or more uplink subbands and the one or more downlink subbands.

3. The method of claim 2, wherein communicating with the network entity using at least one of the one or more uplink subbands and the one or more downlink subbands comprises:
   communicating, with the network entity, in a full duplex communication mode.

4. The method of claim 1, wherein a subband configuration of the plurality of subband configurations indicates a location and bandwidth parameter for an associated uplink subband of the one or more uplink subbands or an associated downlink subband of the one or more downlink subbands; and
   wherein identifying the one or more uplink subbands and the one or more downlink subbands comprises:
      determining, based at least in part on the location and bandwidth parameter, a frequency location and a subband bandwidth for the associated uplink subband or the associated downlink subband.

5. The method of claim 4, wherein the frequency location indicates:
   a starting resource block for the associated uplink subband or the associated downlink subband,
   a center resource block for the associated uplink subband or the associated downlink subband, or
   an ending resource block for the associated uplink subband or the associated downlink subband.

6. The method of claim 1, wherein receiving the SIB indicating the plurality of subband configurations comprises:
   receiving the SIB indicating the plurality of subband configurations prior to receiving a radio resource control configuration during an initial access procedure.

7. The method of claim 1, further comprising:
   identifying, in the SIB, a downlink location and bandwidth parameter field and an uplink location and bandwidth parameter field,
      wherein the downlink location and bandwidth parameter field indicates one or more location and bandwidth parameters for associated downlink subbands, and
      wherein the uplink location and bandwidth parameter field indicates one or more location and bandwidth parameters for associated uplink subbands.

8. The method of claim 1, further comprising:
   identifying, in the SIB, a plurality of location and bandwidth parameter fields, wherein a location and bandwidth parameter field of the plurality of location and bandwidth parameter fields indicates a location and bandwidth parameter for an associated downlink subband or an associated uplink subband.

9. The method of claim 1, further comprising:
   identifying, in the SIB, a location and bandwidth parameter field; and
   identifying, based at least in part on identifying the location and bandwidth parameter field, a plurality of sub-fields associated with the location and bandwidth parameter field,
      wherein a sub-field of the plurality of sub-fields indicates a location and bandwidth parameter for an associated downlink subband or an associated uplink subband.

10. A method of wireless communication performed by a network entity, comprising:
    configuring a system information block (SIB) indicating a plurality of subband configurations, wherein the plurality of subband configurations indicate:
       one or more uplink subbands in a time division duplexing (TDD) component carrier, and
       one or more downlink subbands in the TDD component carrier, wherein the one or more uplink subbands and the one or more downlink subbands are frequency division duplexed within the TDD component carrier; and transmitting the SIB indicating the plurality of subband configurations.

11. The method of claim 10, further comprising:

communicating with a user equipment (UE) using at least one of the one or more uplink subbands and the one or more downlink subbands.

12. The method of claim 11, wherein communicating with the UE using at least one of the one or more uplink subbands and the one or more downlink subbands comprises:

communicating, with the UE, in a full duplex communication mode.

13. The method of claim 10, wherein a subband configuration, of the plurality of subband configurations, indicates a location and bandwidth parameter for an associated uplink subband of the one or more uplink subbands or an associated downlink subband of the one or more downlink subbands; and wherein configuring the SIB indicating the plurality of subband configurations comprises:

determining the location and bandwidth parameter based at least in part on a frequency location and a subband bandwidth for the associated uplink subband or the associated downlink subband.

14. The method of claim 13, wherein the frequency location indicates at least one of:

a starting resource block for the associated uplink subband or the associated downlink subband, a center resource block for the associated uplink subband or the associated downlink subband, or an ending resource block for the associated uplink subband or the associated downlink subband.

15. The method of claim 10, wherein transmitting the SIB indicating the plurality of subband configurations comprises:

transmitting the SIB indicating the plurality of subband configurations prior to transmitting a radio resource control configuration during an initial access procedure.

16. The method of claim 10, further comprising:

configuring, in the SIB, a downlink location and bandwidth parameter field and an uplink location and bandwidth parameter field, wherein the downlink location and bandwidth parameter field indicates one or more location and bandwidth parameters for associated downlink subbands, and wherein the uplink location and bandwidth parameter field indicates one or more location and bandwidth parameters for associated uplink subbands.

17. The method of claim 10, further comprising:

configuring, in the SIB, a plurality of location and bandwidth parameter fields, wherein a location and bandwidth parameter field of the plurality of location and bandwidth parameter fields indicates a location and bandwidth parameter for an associated downlink subband or an associated uplink subband.

18. The method of claim 10, further comprising:

configuring, in the SIB, a location and bandwidth parameter field; and configuring, in the SIB, a plurality of sub-fields associated with the location and bandwidth parameter field, wherein a sub-field of the plurality of sub-fields indicates a location and bandwidth parameter for an associated downlink subband or an associated uplink subband.

19. A user equipment (UE) for wireless communication, comprising:

a memory; and one or more processors coupled to the memory, the one or more processors configured to:

receive a system information block (SIB) indicating a plurality of subband configurations; and identify, based at least in part on one or more of the plurality of subband configurations:

one or more uplink subbands in a time division duplexing (TDD) component carrier, and one or more downlink subbands in the TDD component carrier, wherein the one or more uplink subbands and the one or more downlink subbands are frequency division duplexed within the TDD component carrier.

20. The UE of claim 19, wherein the one or more processors are further configured to:

communicate with a network entity using at least one of the one or more uplink subbands and the one or more downlink subbands.

21. The UE of claim 20, wherein the one or more processors, when communicating with the network entity using at least one of the one or more uplink subbands and the one or more downlink subbands, are configured to:

communicate, with the network entity, in a full duplex communication mode.

22. The UE of claim 19, wherein a subband configuration of the plurality of subband configurations indicates a location and bandwidth parameter for an associated uplink subband of the one or more uplink subbands or an associated downlink subband of the one or more downlink subbands; and wherein the one or more processors, when identifying the one or more uplink subbands and the one or more downlink subbands, are configured to:

determine, based at least in part on the location and bandwidth parameter, a frequency location and a subband bandwidth for the associated uplink subband or the associated downlink subband.

23. The UE of claim 22, wherein the frequency location indicates:

a starting resource block for the associated uplink subband or the associated downlink subband, a center resource block for the associated uplink subband or the associated downlink subband, or an ending resource block for the associated uplink subband or the associated downlink subband.

24. The UE of claim 19, wherein the one or more processors, when receiving the SIB indicating the plurality of subband configurations, are configured to:

receive the SIB indicating the plurality of subband configurations prior to receiving a radio resource control configuration during an initial access procedure.

25. The UE of claim 19, wherein the one or more processors are further configured to:

identify, in the SIB, a downlink location and bandwidth parameter field and an uplink location and bandwidth parameter field, wherein the downlink location and bandwidth parameter field indicates one or more location and bandwidth parameters for associated downlink subbands, and wherein the uplink location and bandwidth parameter field indicates one or more location and bandwidth parameters for associated uplink subbands.

26. The UE of claim 19, wherein the one or more processors are further configured to:

identify, in the SIB, a plurality of location and bandwidth parameter fields, wherein a location and bandwidth parameter field of the plurality of location and bandwidth parameter fields indicates a location and bandwidth parameter for an associated downlink subband or an associated uplink subband.

27. The UE of claim 19, wherein the one or more processors are further configured to:

identify, in the SIB, a location and bandwidth parameter field; and identify, based at least in part on identifying the location and bandwidth parameter field, a plurality of sub-fields associated with the location and bandwidth parameter field, wherein a sub-field of the plurality of sub-fields indicates a location and bandwidth parameter for an associated downlink subband or an associated uplink subband.

28. A network entity for wireless communication, comprising:

a memory; and one or more processors coupled to the memory, the one or more processors configured to:

configure a system information block (SIB) indicating a plurality of subband configurations, wherein the plurality of subband configurations indicate:

one or more uplink subbands in a time division duplexing (TDD) component carrier, and one or more downlink subbands in the TDD component carrier, wherein the one or more uplink subbands and the one or more downlink subbands are frequency division duplexed within the TDD component carrier; and transmit the SIB indicating the plurality of subband configurations.

29. The network entity of claim 28, wherein the one or more processors are further configured to:

communicate with a user equipment (UE) using at least one of the one or more uplink subbands and the one or more downlink subbands.

30. The network entity of claim 29, wherein the one or more processors, when communicating with the UE using at least one of the one or more uplink subbands and the one or more downlink subbands, are configured to:

communicate, with the UE, in a full duplex communication mode.

* * * * *